United States Patent
Panigrahi et al.

(10) Patent No.: US 9,650,728 B2
(45) Date of Patent: May 16, 2017

(54) PROCESSING METHOD FOR FIBER MATERIAL USED TO FORM BIOCOMPOSITE COMPONENT

(71) Applicant: CNH Canada, Ltd., Saskatoon (CA)

(72) Inventors: Satyanarayan Panigrahi, Saskatoon (CA); Radhey Lal Kushwaha, Saskatoon (CA); James Henry, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 263 days.

(21) Appl. No.: 14/087,326

(22) Filed: Nov. 22, 2013

(65) Prior Publication Data

US 2014/0099497 A1   Apr. 10, 2014

Related U.S. Application Data

(63) Continuation-in-part of application No. 13/648,738, filed on Oct. 10, 2012.

(51) Int. Cl.
| | | |
|---|---|---|
| *D01G 15/02* | (2006.01) | |
| *D01G 21/00* | (2006.01) | |
| *C08L 97/02* | (2006.01) | |

(52) U.S. Cl.
CPC .............. *D01G 15/02* (2013.01); *C08L 97/02* (2013.01); *D01G 21/00* (2013.01); *Y10T 428/249921* (2015.04)

(58) Field of Classification Search
CPC ........ D01G 15/02; D01G 21/00; C08L 97/02; Y10T 428/249921
USPC .................................. 524/9; 428/221; 19/98
See application file for complete search history.

(56) References Cited

U.S. PATENT DOCUMENTS

| | | | |
|---|---|---|---|
| 2,658,828 A | 11/1953 | Pattilloch | |
| 5,906,030 A | 5/1999 | Leduc et al. | |
| 6,114,416 A | 9/2000 | Kolla et al. | |
| 6,133,348 A | 10/2000 | Kolla et al. | |
| 6,207,729 B1 | 3/2001 | Medoff et al. | |
| 6,767,634 B2 | 7/2004 | Krishnaswamy | |
| 7,481,843 B2 | 1/2009 | Xu et al. | |
| 7,582,241 B2 | 9/2009 | Mohanty et al. | |
| 2003/0059610 A1 | 3/2003 | Khavkine et al. | |
| 2003/0065059 A1 | 4/2003 | Krishnaswamy | |
| 2003/0087994 A1 | 5/2003 | Frechette | |
| 2003/0157323 A1 | 8/2003 | Khavkine et al. | |
| 2003/0216496 A1 | 11/2003 | Mohanty et al. | |
| 2004/0071964 A1 | 4/2004 | Nesbitt | |
| 2005/0080168 A1 | 4/2005 | Medoff et al. | |
| 2005/0123744 A1 | 6/2005 | Mohanty et al. | |
| 2005/0200050 A1 | 9/2005 | Medoff et al. | |
| 2007/0104936 A1 | 5/2007 | Nesbitt | |
| 2008/0075900 A1 | 3/2008 | Hepworth et al. | |
| 2009/0306253 A1* | 12/2009 | Hansen ................... | C08J 5/045 524/35 |
| 2010/0176354 A1 | 7/2010 | Costard | |
| 2011/0312066 A1 | 12/2011 | Sung et al. | |

FOREIGN PATENT DOCUMENTS

WO   2007104990   9/2007

OTHER PUBLICATIONS

Svensson ("Nanocomposites made from nanoporous cellulose fibres", http://www.diva-portal.org/smash/get/diva2:559814/FULLTEXT02—Online Sep. 25, 2012).*
Merdan et al., "Dyeing of Enzymatic Treated Hemp Fibre by Microwave Method", RMUTP International Conference: Textiles & Fashion 2012, Jul. 3-4, 2012, Bangkok, Thailand.
A.C. Tripathy, "Characterization of Flax Fibres and the Effects of Differnet Drying Methods for Making Biocomposites", University fo Saskatchewan, Saskatoon, Saskatchewan, 2009.
Kalia et al., "Pretreatments of Natural Fibers and their Applicaiton as Reinforcing Material in Polymer Composites—A Review", Polymer Engineering and Science, 2009, pp. 1253-1272.
Xue Le, Development of Flax Fiber-Reinforced Polyethylene Biocomposites by Injection Molding: Thesis Submitted to College of Graduate Studies and Research, Dept. of Agricultural and Bioresource Engineering, Univ. Saskatchewan; Mar. 2008; Saskatoon, Saskatchewan, Canada.
Rho et al., "Process of Flax Fibers for Biocomposites Using a Thermostable Pectate Lyase," 2008 International Conference on Flax and Other Bast Plants, ISBN #978-0-9809664-0-4, pp. 201-210.
Hu, Wei et al,, "Influence of retting process on the thermal and mechanical properties of flax/polypropylene composites made of Canadian oilseed flax fibers," Proceedings of the Polymer Processing Society 26th Annual Meeting: Jul. 4, 2010, 6 pages.

* cited by examiner

*Primary Examiner* — Ling Choi
*Assistant Examiner* — Ronald Grinsted
(74) *Attorney, Agent, or Firm* — Rebecca L. Henkel; Rickard K. DeMille

(57) ABSTRACT

The present invention is directed to plant fiber-reinforced biocomposite thermoplastic and/or resin compositions and a method for reinforcing thermoplastic resins. The present invention provides a use for the cellulose portion of a plant material, which is the portion left over after processing the selected plant materials to separate the cellulose in a mechanical process that does not damage the internal molecular structure of the cellulose fraction, enabling the cellulose fraction to chemically bond with the thermoplastic resin to enhance the reinforcement of the resin or thermoplastic biocomposite composition.

19 Claims, 3 Drawing Sheets

PROCESSING METHOD FOR FIBER MATERIAL USED TO FORM BIOCOMPOSITE COMPONENT

CROSS-REFERENCE TO RELATED APPLICATIONS

This application claims priority as a continuation-in-part of U.S. Non-Provisional patent application Ser. No. 13/648,738, filed on Oct. 12, 2012, the entirety of which is expressly incorporated by reference herein.

FIELD OF THE DISCLOSURE

The present invention relates to a method for obtaining high-strength fibers of plant materials for use in reinforcing biocomposite compositions. More particularly, the plant fibers are obtained from the raw plant material in a manner that minimizes any alteration of or damage to the interior molecular structure of the fibers to enhance the strength of the fibers when utilized to reinforce the biocomposite composition.

BACKGROUND OF THE DISCLOSURE

The plastics industry is one of the largest consumers of organic and inorganic fillers. Inorganic fillers such as calcium carbonate, talc, mica and the like are well known, as well as organic fillers such as wood flour, chaff and the like, fibrous materials such as asbestos and glass fiber, as well as graphite, cokes, blown asphalt, activated carbon, magnesium hydroxide, aluminum hydroxide and the like. All of these additives have high specific gravities and their ability to improve physical properties of the composition is limited.

As an alternative to particulate fillers, thermoplastic materials can also be formed with fibrous materials to overcome those deficiencies. Fiber-reinforced composite materials based on thermoplastic materials are being increasingly used in many areas of technology in place of metallic materials as they promise a substantial reduction in weight, with mechanical characteristics which are otherwise comparable in many respects. For that purpose, besides the thermoplastic matrix, these composite materials include a fibrous component which has a considerable influence on mechanical characteristics, in particular tensile and flexural strength as well as impact toughness of the composite material. Fibrous components used are (i) fibers of inorganic materials such as glass, carbon and boron, (ii) metallic fibers, for example of steel, aluminum and tungsten, (iii) synthetic organic fibers, for example of aromatic polyamides, polyvinyl alcohols, polyesters, polyacrylates and polyvinyl chloride, or (iv) fibers of natural origin, for example hemp and flax.

The use of glass fiber-reinforced thermoplastic materials has of particular significance. In FIG. 1, a prior art process for the incorporation of glass fibers into a plastic resin, such as polypropylene, is illustrated. The polypropylene 10 is initially combined at a suitable temperature and pressure with the glass fibers 12 and other additives 14, as desired. The polypropylene 10, glass fibers 12 and additives 14 are mixed to form the composite material 16. This composite material 16 can be subsequently extruded at 18 for use in an injection molding process 20 to form a final molded product 22 having properties provided by the combination of the polypropylene 10 and glass fibers 12, along with any additional desired properties provided by the additives 14.

However, the production of glass fibers requires the use of considerable amounts of energy and the basic materials are not biological in origin so that the sustainability of the production process is open to criticism from ecological points of view. Furthermore, the disposal of glass fiber-reinforced thermoplastic materials is made difficult as even upon thermal decomposition of the material, considerable amounts of residues are left, which generally can only be taken to a disposal site. Finally glass fibers involve a high level of abrasiveness so that processing the materials in the context of usual processing methods for thermoplastic materials encounters difficulties.

Because of the above-mentioned disadvantages but also generally to improve the material properties therefore at the present time there is an intensive search for possible ways of replacing the glass fibers which dominate in many technical uses, as a reinforcing component. Organic fibrous materials of natural origin, such as plant materials appear to be particularly attractive in this connection because of their lower density and the reduction in weight that this entails in the composite material as well as sustainability and easier disposal.

The potential of using natural or plant fibers in plastic applications as a substitute for synthetic fibers such as glass, carbon, nylon, polyester, etc. has been recognized. For example, Kolla et al. U.S. Pat. No. 6,133,348, which is hereby expressly incorporated by reference herein, describes flax shives reinforced thermoplastic compositions and a method for reinforcing thermoplastic resins. The invention disclosed in Kolla provides a use for flax shives or particles in the thermoplastic compositions, which is the portion left over after processing plant materials to separate plant fibers (bast fibers) from the shives. The shives are the core tissue fibers which remain after the bast fibers are removed from the flax stem via the mechanical separation process disclosed in Leduc et al. U.S. Pat. No. 5,906,030, or other mechanical separation processes involving the hammering or bending of the natural plant fibers. These core tissue fibers include the cellulose, hemi-cellulose and lignin components of the flax fiber, along with a smaller portion of the woody bast fibers that remain on the shives, giving the shives a fiber purity of approximately eighty percent, at maximum.

It will be noted however that the use of natural fibrous materials as a fiber-reinforcing component can be confronted with worse mechanical characteristics in the resulting composite materials, in comparison with fiber-reinforced composite materials with glass fiber constituents. Furthermore natural fibers such as flax, hemp or also wood particles are of a fluctuating composition: individual batches of the material differ depending on the respective cultivation area, cultivation period, storage and possibly preliminary treatment. That means however that the mechanical characteristics of the fiber-reinforced thermoplastic materials to be produced also vary, which makes technical use thereof more difficult. The material can further change in form and appearance by virtue of progressing degradation processes. Finally, the constituent components of the various natural fibers can themselves create issues when the fibers are utilized in this manner. In particular, the hemi-cellulose fraction of natural fibers absorbs moisture, causing a detrimental effect on the dimensional stability and water resistance properties of any thermoplastic material to which the natural fibers are added.

Furthermore, due to the myriad of environmental and production issues concerning the use of plastic materials in general, it is desirable to develop materials that can provide the same attributes as plastic materials, including fiber-reinforced plastic material.

As an alternative to plastics including natural fiber reinforcing materials, biocomposite materials are often utilized as a substitute, particularly for low end plastic and fiberglass materials. One of the shortcomings of biocomposite materials is that the fibers included within the biocomposite material only act as a filler layer and do not form a bond with the other components of the biocomposite, thereby reducing the strength and durability of the biocomposite materials. A primary reason for this is that the fibers used to reinforce the biocomposite material have an interior molecular structure that is often damaged as a result of the mechanical processes used for obtaining the fibers form the raw plant material. This damage prevents the fibers from effectively bonding with the other biocomposite materials, thereby preventing the biocomposite materials from being fully reinforced by the fibers.

As a result it is desirable to develop a method for obtaining the reinforcing fibers from raw plant material that preserves the interior molecular structure of the fibers such that the fibers can form effective bonds with the other biocomposite materials, thereby enhancing the strength and durability of the biocomposite materials.

SUMMARY OF THE DISCLOSURE

According to one aspect of the present disclosure, fibers of natural plant materials are used in the filling and reinforcement of formed biocomposite materials including the fibers. The fibers are obtained from the plant materials in a manner that enables the fibers to be substituted for the synthetic fibers and form chemical bonds with the other biocomposite material components to at least achieve similar mechanical characteristics for the biocomposite material as when synthetic fibers are used, in particular the tensile and flexural strength as well as impact toughness. In addition the use of the fibers of natural plant materials do not absorb and retain water, and thus do not detrimentally affect the waterproof properties of the biocomposite material. Further, the fibers of the natural plant component do not compromise the ability of the biocomposite material to be readily disposed of and/or recycled.

According to another aspect of the present disclosure, the natural plant fibers are mechanically treated prior to chemical treatment in order to obtain relatively pure plant material for use in the chemical extraction process. The particular mechanical treatment or decortication is accomplished in a manner that reduces the breakage of the core fibers, leaving the interior molecular structure of the fibers undamaged. This results in fibers that after further treatment can chemically bond with the components of the biocomposite composition to provide a stronger biocomposite composition with enhanced strength and lighter weight than other biocomposite materials.

Numerous additional, objects, aspects and advantages of the present invention will be made apparent from the following detailed description taken together with the drawing figures.

BRIEF DESCRIPTION OF THE DRAWINGS

The drawing figures illustrate the best mode of practicing the present disclosure.

In the figures.

DETAILED DESCRIPTION OF THE DISCLOSURE

Figure 1:
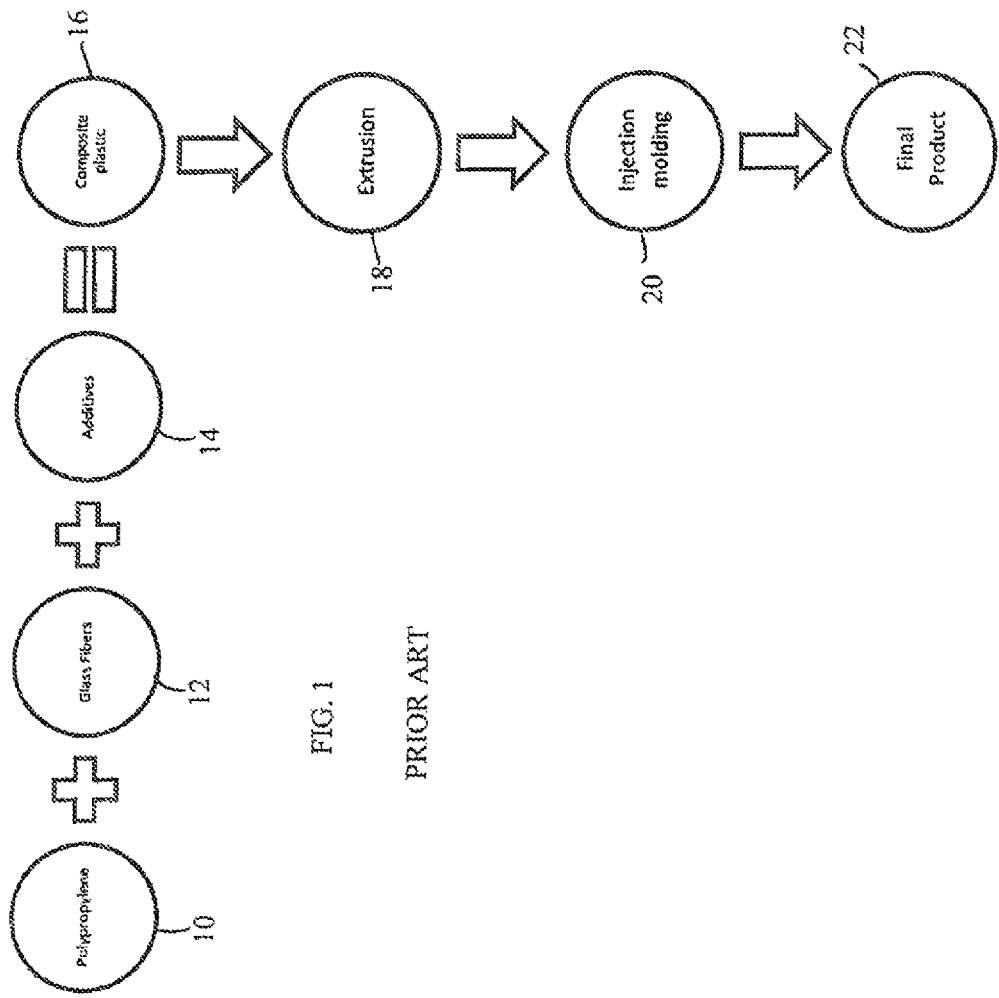
FIG. 1 is a schematic view of a prior at composite material production process.
Figure 2:
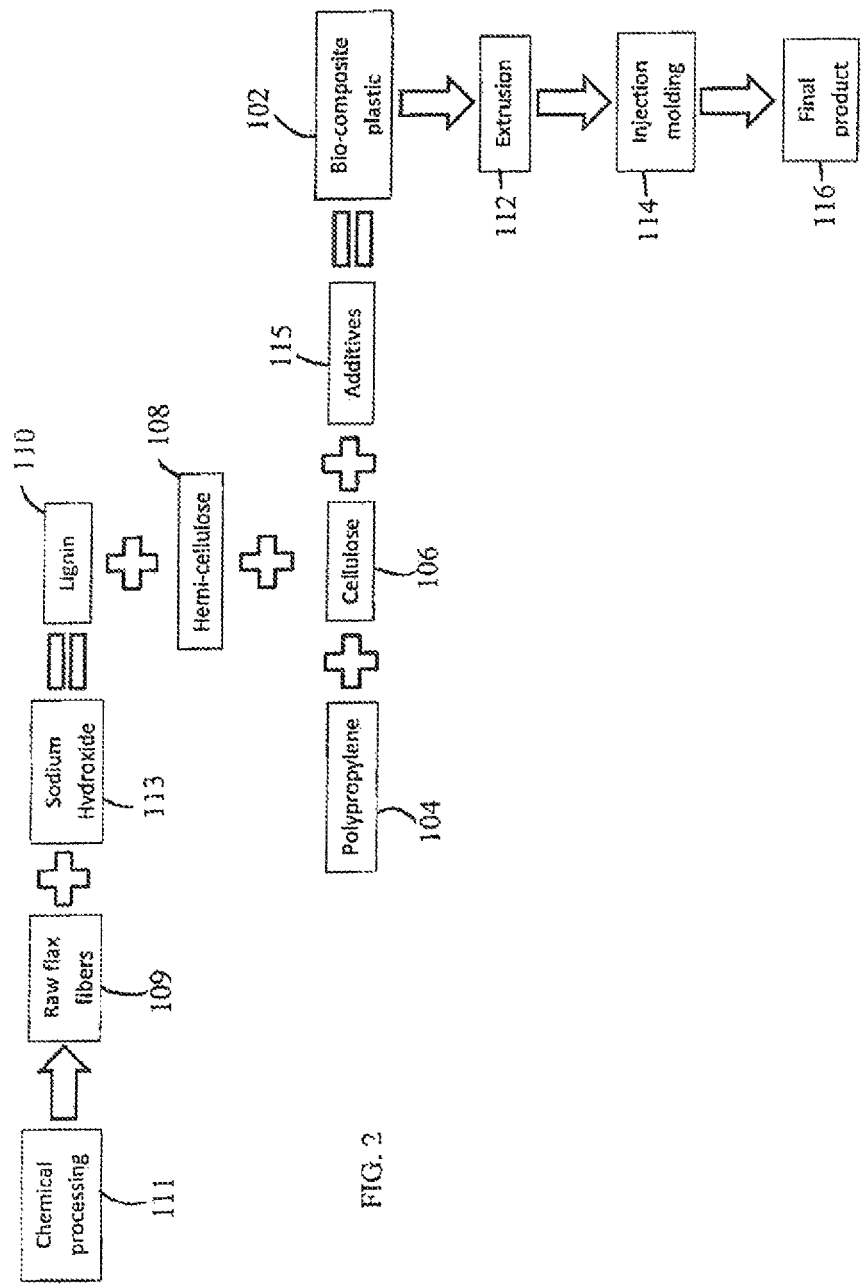
FIG. 2 is a schematic view of a first embodiment of a composite material production process according to the present disclosure.

Referring now to the drawing figures in which like reference numerals designate like numerals throughout the disclosure, FIG. 2 illustrates a process for the formation of a product 116 created using a composite material 102.

The composite material 102 is formed of a thermoplastic resin or material 104, which is the term used to denote polymer materials which are soft or hard at the temperature of use and which have a flow transitional range above the temperature of use. Thermoplastic resins or materials comprise straight or branched polymers which in principle are capable of flow in the case of amorphous thermoplastic materials above the glass transition temperature ($T_g$) and in the case of (partly) crystalline thermoplastic materials above the melting temperature ($T_m$). They can be processed in the softened condition by pressing, extruding, injection molding or other shaping processes to afford shaped and molded parts. The thermoplastic material 104 used in the present disclosure can be any suitable thermoplastic resin material or combination of multiple thermoplastic materials, such as a plastic including one or more natural or petroleum based thermoplastic resins such as polyethylene, polypropylene, polystyrene, polyvinyl chloride, polyacryl nitrite, polyamides, polyesters. polyacrylates and Poly Lactic Acid (PLA), among others. The thermoplastic material does not have to be a homopolymer but can also be in the form of a copolymer, a polypolymer, a block polymer or a polymer modified in some other fashion. Polypropylene is a particularly useful thermoplastic material for use in forming the composite material 102 of the present disclosure.

In addition to the thermoplastic material 104, the composite material 102 includes cellulose fibers 106. These fibers 106 can be obtained from any suitable natural plant material 109, such as natural fibrous plant materials including a) seed fiber plants, in particular linters, cotton, kapok and poplar down, b) bast fiber plants, in particular sclerenchyma fibers, bamboo fibers, (stinging) nettles, hemp, jute, linen or flax (fibre flax and oil seed flax), and ramie, c) hard fiber plants, in particular sisal, kenaf and manila, coir, and e) grasses. Bast fiber plants, such as flax and hemp, are particularly useful natural non woody, plant materials from which the cellulose fibers 106 can be obtained.

The bast plants include outer bast fibers that run longitudinally along the length of the plants and core tissue fibers disposed within the outer bast fibers. Because the core tissue fibers are the desired fibers, the outer bast fibers must be removed prior to use of the core fibers. In removing the outer bast fibers, care must be taken to avoid damaging or breaking the core tissue fibers in order to maximize the length of the core tissue fibers. Thus in a first step the straw is ratter under controlled environmental conditions (e.g., field rated, chemically rated and/or water rated) followed by mechanically treating the bast plant materials, in which the plant materials are decorticated by shearing the bast fibers from the core tissue fibers, as opposed to hammering or bending/flexing the plant material as in prior decortication processes. By shearing the bast fibers from the core tissue fibers, the core fibers can be kept intact more readily, thereby maintaining the overall strength and length of the core fibers. Using this process, core fibers of approximately 95-98% purity can be obtained. In addition, both ratted and non-ratted plant material can be used in the decortications process to obtain a clean core tissue fiber that can be used for production of the composite material.

In each case, the core fibers of the natural fibrous plant materials 109 include cellulose, hemi-cellulose and lignin components. To obtain the cellulose fibers 106 utilized to form the composite material 102 from the natural plant material, the hemi-cellulose fraction 108 and lignin fraction 110 are separated from the cellulose fibers or fraction 106, such that a purified crystalline cellulose fraction 106 can be added to the thermoplastic material 104 to form the composite material 102.

To separate the cellulose fibers/fraction 106 from the hemi-cellulose fraction 108 and lignin fraction 110 of the natural plant material 109, any suitable process 111 can be utilized, such as those employed on natural plant materials 109 for paper pulping, e.g., soda or kraft pulping, among others. More specific examples of processes for the separation of the hemi-cellulose fraction 108 and lignin fraction 110 from the cellulose fibers 106 of the plant material 109 include those that utilize an alkaline material 113, examples of which are disclosed in Hansen et al. U.S. Patent Application Publication No. 2009/0306253 and Costard U.S. Patent Application Publication No. 2010/0176354, among others, each of which are hereby expressly incorporated by reference herein in their entirety.

One suitable example is an alkaline separation process shown in Costard U.S. Patent Application Publication No. 2010/0176354 where a natural plant fiber material 109 is solubilized in an alkaline manner and which is characterized in that the natural fiber material 109 is treated with an alkaline material 113 without being subjected to mechanical stress a) at a temperature of between 5 and 30° C. and then b) at a temperature of between 80 and 150° C., and is then optionally washed and/or dried.

The alkaline materials 113 that can be used are, among other suitable alkaline materials, alkali metal hydroxide, in particular sodium hydroxide or potassium hydroxide, alkali metal carbonates, in particular sodium carbonate or potassium carbonate, or alkali metal phosphates, in particular trisodium phosphate or tripotassium phosphate.

The fiber degradation takes place at a pH of approximately between 8 to 14, preferably 10 to 14, more preferably 11 to 12 in the cold process (step a)) and preferably at a temperature of between 10 and 30° C., preferably between 10 and 25° C., in particular between 15 and 25° C., more preferably between 15 and 20° C.

The cold treatment according to step a) takes place over a period of 10 minutes to 3 hours, in particular 15 minutes to 2 hours and preferably 30 minutes to 1 hour. The hot treatment used according to step b) of the natural fiber material also takes place between a pH of 8 to 14, preferably 10 to 14, more preferably 11 to 12, and preferably at a temperature of between 80 and 140° C., preferably between and 140° C., in particular between 90 and 135° C., more preferably between 100 and 135° C.

The hot treatment according to step b) takes place preferably over a period of 20 minutes to 1.5 hours, in particular 30 minutes to 1 hour and preferably 45 minutes to 1 hour. The concentration of alkaline material in water in steps a) and/or b) is, based on the active ingredient (typically a solid), preferably in the range from 5 to 15 g/l, in particular 7 to 13 g/l, preferably 8 to 12 g/l, particularly preferably at about 10 g/l.

The process performed according to steps a) and b) effectively dissolves the hemi-cellulose fraction 108 and lignin fraction 110 from the natural plant material 109, which can subsequently be removed with the alkaline solution, leaving the cellulose fraction 106 behind for subsequent washing and drying to a desired moisture level, e.g., about 2% by weight or below.

The alkaline treatment according to the disclosure can be supported by adding excipients. Dispersants, complexers, sequestering agents and/or surfactants are suitable here. Water glass and foam suppressors can likewise optionally be used depending on the end-application. Other customary excipients can also be used. The addition of a complexer, dispersant and/or surfactant to the baths can accelerate and intensify the wetting of the fibers. The materials customarily used for these respective purposes in fiber treatment are suitable here.

When separated, the cellulose fibers 106 are at least 95% w/w pure cellulose fibers. i.e., the fibers 106 contain not more than about 5 weight percent of material other than cellulose, i.e., lignin and hemi-cellulose. Further, the cellulose fibers 106 have a mean fiber length of less than about 2 mm.

Once liberated from the natural plant material 109, the cellulose fibers 106 can be utilized to form the composite material 102. These fibers 106 can be colored easily as the fibers 106 are very light, i.e., almost white in color and the composite made out of these is odorless. Chemical treatment of fiber 106 affects the cellulose structure, e.g., decreasing crystallinity and increasing the amorphous structure. For example, the chemical treatment opens the bonds in the cellulose fraction or fibers 106 for interaction with the polymer matrix 104 in forming the composites 102. The composite material 102 of the present disclosure may mixed together and processed by extrusion, compression molding, injection molding, or any other similar, suitable, or conventional processing techniques for synthetic or natural biocomposites.

FIG. 2 shows one embodiment of the processing of the composite material 102 of the present disclosure. The ingredients of the composite material 102, i.e., a thermoplastic material 104 and the cellulose fibers 106, may be blended or compounded with one another in a manner effective for completely blending the cellulose fibers 106 with the thermoplastic material 104, such as in a suitable mixer, e.g., a high or low intensity mixer. Depending upon the particular composition of the thermoplastic material 104 and the cellulose fibers 106, the temperature of the mixer in one embodiment should be from about 140° C. to about 220° C. for the proper combination of the components to form the composite material. One example of a mixer effective for blending the fibers 106 and thermoplastic material 104 is a high intensity thermokinetic mixer. In these types of mixers, frictional energy heats the contents until they become molten, a process that takes seconds or minutes depending on the speed of the impeller. In another aspect of the invention, heat from an external source can be supplied to melt the thermoplastic material 104 and effect blending of the cellulose fibers 106. An example of a low intensity mixer is a ribbon blender.

The formulation of the composite material 102 can be tailored by modifying the amounts or ratios of the thermoplastic material 104 and the cellulose fibers 106 used to form the composite material 102 depending on the particular application and/or function for the composite material 102. Additives (including, but not limited to, flow enhancers, anti-oxidants, plasticizers. UV-stabilizers, foaming agents, flame retardants, etc.) are used in formulation to enhance the functionality of the composite product. To accommodate the particular use and corresponding required properties of the composite material 102, the blending of the polymers/thermoplastic material 104 and the fibers 106 can also be varied in temperature and pressure. In addition, the blending parameters and component ratios for the composite material 102 can be altered depending upon the particular pant material from which the fibers 106 are obtained. Examples of the polymers used as the material 104 include, but are not limited to acrylonitrile butadiene styrene, polyethylene, polypropylene, polystyrene, polyvinyl chloride, polyacryl nitrite, polyamides, polyesters, polyacrylates, other engineering plastics and mixtures thereof.

In some particular embodiments of the composite material 102, the weight ratios/percentages of the thermoplastic material 104 and the cellulose fibers 106 used in the formation of the composite material 102 range from 1-60%. The fibre loading in biocomposite for the following process can be varied from process to process. Exemplary fiber loading percentages according to various molding processes in which the biocomposite material 102 is used are as follows:

Extrusion products: 1-30% (product examples: pipes, profiles)

Injection molding: 1-45% (product examples: small to large components for various industries such as agricultural machinery products, automotive interior and under hood products etc.).

Compression molding: 1-60% (product examples: kitchen cabinets, bicycle components, interior products for agricultural machineries (such as combine, tractor, and automotive (car, bus etc.).

Rotational molding: 1-30% (product examples: water tanks, large storage boxes)

Vacuuming forming/Thermoforming: 1-20% (product examples: packaging materials, cups, plates, boxes, building insulation)

In one particular embodiment, the mixing/extruding of the thermoplastic material 104 and the cellulose fiber 106 to form the composite material 102 is performed with a dry blender, mixer, parallel screw extruder. The parallel screws in the device serve to blend the fibers 106 homogeneously with the polymer 104, while also reducing the damage and/or breakage of the cellulose fibers 106 in the mixture forming the composite material 102. In addition, the parallel screws help to reduce the residence time of the composite material formulation 102 by increasing the speed of mixing of the components of the composite material 102 in the device.

As a result of the use of purified cellulose fibers 106 obtained via the mechanical and chemical processing described previously, the fibers 106 develop a molecular bonding with the thermoplastic material 104 when blended to form the composite material 102 which provides superior performance of to composite materials having, only mechanical binding between the polymer and the reinforcing fibers. Without wishing to be bound by any particular theory, it is believed that this molecular bonding occurs as a result of the thermoplastic material 104 flowing into and filling the inside the modified fibers 106 during the mixing/extrusion process. The increase in the melting temperature of the biocomposite 102 indicates a possible polymerization effect of the fiber that diffuses or dissolves into the polymer in the composite and correspondingly increases the thermal resistance of composite. Due to the porous surface of the treated fiber, molten polymer matrix enters in to the porous fiber and interlocks with each other and to form a strong binding within the biocomposite 102. Further investigation is required to determine the exact nature of bond. In addition, polymer matrixes encapsulate the fibre and enhance the biocomposite strength and reduce the porosity and the formation of air pockets within the biocomposite. This molecular bonding between the fibers 106 and the thermoplastic material 104 significantly improves the properties of the composite material 102, e.g., mechanical properties including tensile and flexural strength as well as impact toughness, and thermal properties. The properties of the biocomposite 102 vary as a result of the fibre loading and the type of polymer and/or additives used in the formation of the biocomposite 102. This, in turn, enhances the functionality of products 122 formed of the composite material 102 and enable the products 122 to be used in a wider range of industrial applications than prior fiber-reinforced materials. Also, in conjunction with the reduction in processing time in the parallel screw device, the molecular bonding between the fibers 106 and the polymer 104 limits any significant reduction of inbuilt additives present in polymer/thermoplastic material 104. As a result, it is only necessary to supplement any required additives, such as bonding additives, present in the polymer 104 during the formulation of the composite material 102, as opposed to adding the entire amount of the additives outside of those contained in the polymer 104.

Once mixed/compounded, the melted composite material 102 can be allowed to cool to room temperature and then further processed by conventional plastic processing technologies. Typically, the cooled blend is granulated into fine particles. The fine particles are then utilized for extrusion 112, injection 114 and/or compression molding to form finished parts or products 116.

In an alternative embodiment, the mixer can be operated without heat, such that the thermoplastic material 104 and cellulose fibers 106, after being mixed together, are transferred to a feed hopper, such as a gravity feed hopper or a hopper with a control feed mechanism. Alternatively, the thermoplastic material 104 and the cellulose fibers 106 can be individually fed to the extruder without being previously mixed together. The feed hopper transfers the composite to a heated extruder 112.

The extruder 112 blends the ingredients under sufficient heat and pressure. Several well-known extruders may be used in the present invention, e.g., a twin screw extruder. The extruder 112 forces or injects the composite material 102 into a mold 114. In an exemplary embodiment, the flow rate of the extruder 112 may be between about 150 and 600 pounds per hour. In other embodiments, the flow rate may be higher or lower depending on the type and size of the extruder 112. The injection mold 114 may be made up of one or more plates that allow the composite material 102 to bond and form a shaped-homogeneous product 116. A typical plate may be made from hardened steel material, stainless steel material or other types of metals. A cooling system (e.g., a liquid bath or spray, an air cooling system, or a cryogenic cooling system) may follow the injection mold 114.

In the mixer, a number of optional processing aids or additives 115 can be added to the thermoplastic material 104 and the cellulose fibers 106. These processing aids or modifiers act to improve the dispersion of fibers 106 in the thermoplastic polymer material 104 and also help further prevent the absorption of water into the fibers 106 and improve the various thermal, mechanical and electrical properties of the composite material 102, e.g., the strength of the resulting composite material 102. The addition levels of the modifiers or compatibilizers used depends on the target properties. For example, where higher tensile and flexural strengths are desired, higher levels of modifier or compatibilizer will be required. A compatibilizer is not required to achieve higher stiffness.

In one particular example of the present disclosure, the composite material 102 includes an amount of an wear additive 115 selected from aluminum or copper powder, or combinations thereof to increase the wear properties and enhance the longevity of the final product 122.

With regard to the molding processes 120 used to form the final product 122, the composite material 102 improves the product 122 formed by these processes 120 through the reduction of the formation of pin holes and the porosity of the material product 122. Without wishing to be bound by any particular theory, it is believed that these results are achieved in the composite material 102 as a result of the close packing and increased density of the fibers 106, polymer 104 and additives 115 due to the properties of the cellulose fibers 106, and the consequent removal of entrapped air bubbles during the processing of the fibers 106 and thermoplastic material 104, along with the additives 115, to form the composite material 102. As a result the final product 122 is more solid and stronger than products formed from prior fiber-reinforced materials.

Further, with the use of the cellulose fibers 106 formed in the above-described manner, it is possible to achieve higher grade properties (mechanical, thermal, electrical, etc.) for the final product 122 while using lower grade thermoplastic materials 104 in combination with the cellulose fibers 106. In particular, as a result of the properties and purity of the cellulose fibers 106, the fibers 106 can bond well with a wide range of grade of polymeric/thermoplastic materials 104 to achieve products 122 with the desired properties. Further, to address any issues presented by the particular polymer/thermoplastic material 104, the weight percentage or weight ratio of the fibers 106 can be increased, in formulation of composite material 104 without compromising the quality and desired properties of the final product 122. In addition, by increasing the amount of the cellulose fibers 106 utilized in the composite material 102, the consequent consumption of the polymer 104 will be reduced.

For a better understanding of the objects and advantages of the present invention, the same will be now described by means of several examples. However, it should be understood that the invention is not limited to such specific examples, but other alterations may be contemplated within the scope and without departing from the spirit of the invention as set forth in the appended claims.

While the formulation of the particular biocomposite material 102 depends on the final product 122 formed from the biocomposite material 102, its functionality, and/or as described above the particular molding process used to form the biocomposite material 102 into the final product 122.

In one example of biocomposite composition 102, the formulation includes:

a) natural/petroleum based thermoplastic material(s): 99-40% w/w
b) fiber 1-60% w/w
c) additives 1-5% w/w.

Biocomposite materials 102 of different grade (e.g., extrusion grade, injection grade, compression grade, rotational grade, vacuum forming grade) are manufactured by changing the formulation of the biocomposite material 102, and in one example by changing the amount of fiber 106 present and consequently adjusting the percentages of the remaining components.

One particular example of a thermoforming/vacuum forming formulation for the biocomposite material 102 is as follows:

a) polystyrene
b) treated natural fiber
c) butane
d) additives (zinc stearate, magnesium stearate)
e) talcum powder.

Other examples of biocomposite material 102 formed according to the present disclosure are found in the following tables. The properties can be modified according to product requirement by changing/modifying the formulation

TABLE 1

Properties

Liner low density polyethylene - dicumyl peroxide pre-treated flax fibre

| Composite properties | Unit | Flax straw/Industrial Hemp stalk | | | | | | | |
|---|---|---|---|---|---|---|---|---|---|
| | | Unretted | | Field retted | | Water retted | | Chemically retted | |
| | | Flax | Hemp | Flax | Hemp | Flax | Hemp | Flax | Hemp |
| Melt Flow Index | g/10 min | 2.8 | 2.6 | 3.7 | 3.5 | 4.1 | 3.4 | 3.8 | 3.5 |
| Melting point | °C. | 130 | 128 | 129 | 127.4 | 130.1 | 128 | 130.6 | 129 |
| Tensile Strength | Mpa | 13.2 | 15.3 | 17.6 | 16.9 | 18.3 | 18.7 | 22.2 | 21 |
| Tensile Impact strength | KJ/m$^2$ | 178 | 172 | 188 | 182 | 194 | 178 | 223 | 205 |
| Hardness | SD | 12 | 11 | 17 | 18 | 18 | 17 | 23 | 21 |
| Water absorption@50 RH | % | 3-5 | 2-6 | <1 | <1 | <1 | <1 | <1 | <1 |

TABLE 2

Properties

Liner low density polyethylene - triethoxyvinylsilane pre-treated flax fibre

| Composite properties | Unit | Flax straw/Hemp stalk | | | | | | | |
|---|---|---|---|---|---|---|---|---|---|
| | | Unretted | | Field retted | | Water retted | | Chemically retted | |
| | | Flax | Hemp | Flax | Hemp | Flax | Hemp | Flax | Hemp |
| Melt Flow Index | g/10 min | 2.0 | 2.2 | 2.7 | 2.4 | 2.6 | 2.4 | 2.8 | 2.4 |
| Melting point | °C. | 129 | 131.2 | 128.6 | 129 | 129 | 129 | 129 | 129.6 |
| Tensile Strength at Yield | Mpa | 15 | 14.2 | 18.4 | 17.1 | 20.1 | 17.4 | 19.3 | 17.9 |
| Tensile Impact strength | KJ/m$^2$ | 178 | 161 | 188 | 186 | 199 | 193 | 218 | 209 |
| Hardness | SD | 9 | 11 | 14 | 15 | 19 | 19 | 20 | 18 |
| Water absorption@50 RH | % | 3-5 | 2-6 | <1 | <1 | <1 | <1 | <1 | <1 |

TABLE 3

Properties

High density polyethylene - benzoyl chloride pre-treated flax fibre

| Composite properties | Unit | Flax straw/Hemp stalk | | | | | | | |
|---|---|---|---|---|---|---|---|---|---|
| | | Unretted | | Field retted | | Water retted | | Chemically retted | |
| | | Flax | Hemp | Flax | Hemp | Flax | Hemp | Flax | Hemp |
| Melt Flow Index | g/10 min | 1 | 1.2 | 1.6 | 1.5 | 1.8 | 1.7 | 1.8 | 1.4 |
| Melting point | °C. | 130 | 128 | 130 | 130 | 129 | 130 | 129 | 130 |
| Tensile Strength at Yield | Mpa | 16.3 | 13.7 | 16.3 | 16.2 | 18 | 18.1 | 23.4 | 19.2 |
| Tensile Impact strength | KJ/m$^2$ | 167 | 157 | 177 | 179 | 188 | 185 | 221 | 178 |
| Hardness | SD | 17 | 11 | 12 | 15 | 19 | 22 | 21 | 19 |
| Water absorption @50 RH | % | 3 | 2 | <1 | <1 | <1 | <1 | <1 | <1 |

TABLE 4

Properties

High density polyethyene - dicumyl peroxide pre-treated flax fibre

| Composite properties | Unit | Flax straw/Hemp stalk | | | | | | | |
|---|---|---|---|---|---|---|---|---|---|
| | | Unretted | | Field retted | | Water retted | | Chemically retted | |
| | | Flax | Hemp | Flax | Hemp | Flax | Hemp | Flax | Hemp |
| Melt Flow Index | g/10 min | 0.5 | 0.8 | 1.0 | 1.5 | 1.2 | 1.6 | 1.6 | 1.5 |
| Melting point | °C. | 130 | 126 | 131.6 | 128.4 | 128 | 129 | 129 | 128 |
| Tensile Strength at Yield | Mpa | 15 | 14.3 | 16.8 | 15.4 | 17.5 | 18.1 | 24.1 | 21.2 |
| Tensile Impact strength | KJ/m$^2$ | 180 | 167 | 197 | 180 | 185 | 185 | 220 | 180 |
| Hardness | SD | 13 | 9 | 14 | 12 | 15 | 12 | 17 | 15 |
| Water absorption@50 RH | % | 3 | 2 | <1 | <1 | <1 | <1 | <1 | <1 |

Oilseed flax and industrial hemp fiber has promising future in the plastic industries. It is observed that unretted and chemically retted flax and hemp can be used in plastic composite (LLDPE and HDPE). Chemically retted fiber increased the $T_m$ of composite compared to pure polyethylene. The increase of $T_m$ may be attributed to the polymerization effect of the fiber that diffuses or dissolves into the polymer in composite and increased the thermal resistance of composite. This investigation indicated that chemical retting has a great influence on mechanical properties of (flax and hemp) polymer composites products developed through rotational molding processes.

Figure 3:
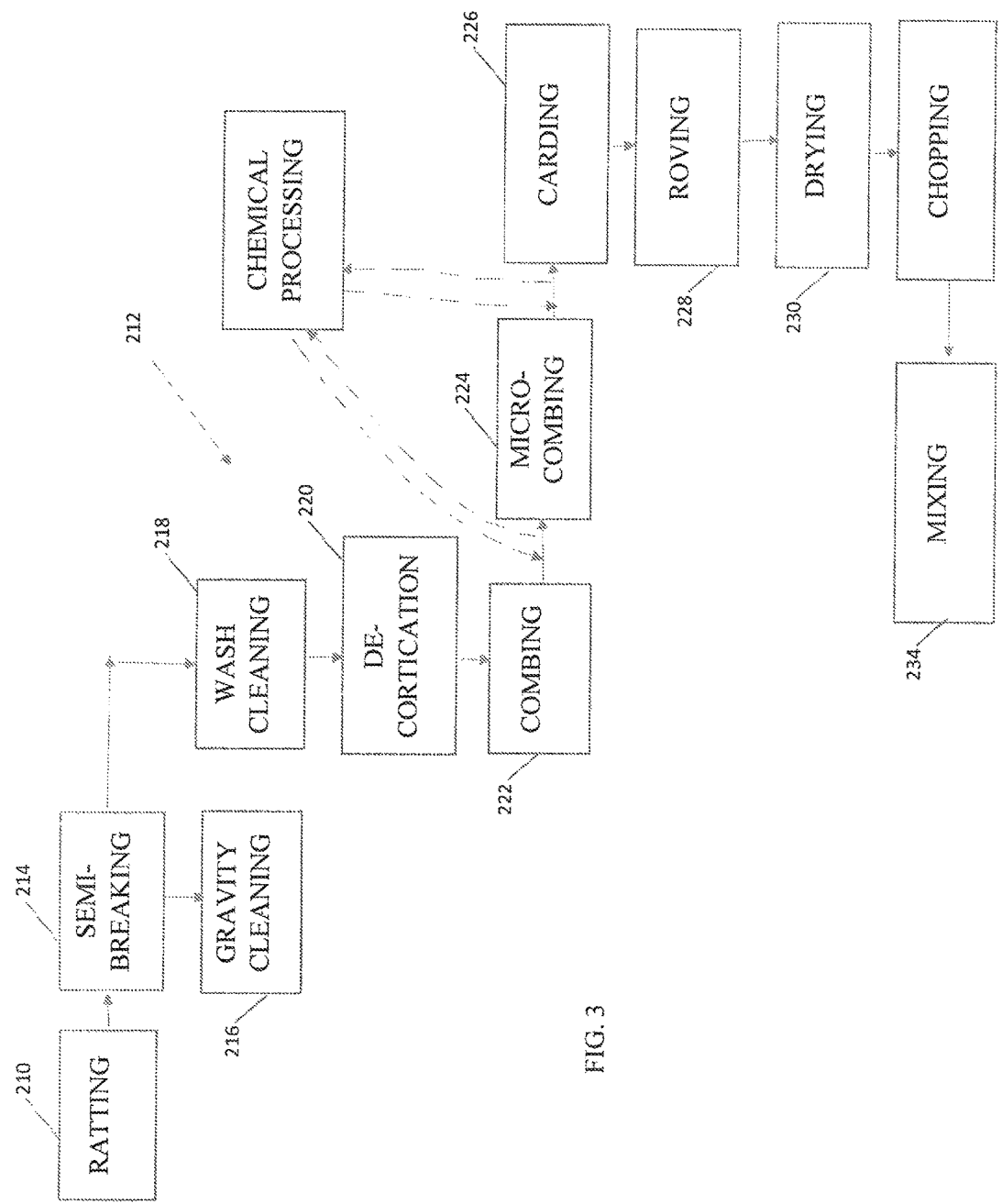
FIG. 3 is a schematic view of a second embodiment of a composite material production process according to the present disclosure.

Looking now at FIG. 3, a second embodiment of the process for forming the biocomposite material 102 formed with a thermoplastic material 104 is shown according to the present disclosure.

Similar to the first embodiment in FIG. 2, in addition to the thermoplastic material 104, the biocomposite material 102 includes plant material fibers 108. These fibers 108 can be obtained from any suitable natural plant material 106, such as natural fibrous plant materials including a) seed fiber plants, in particular linters, cotton, kapok and poplar down, b) bast fiber plants, in particular sclerenchyma fibers, bamboo fibers, (stinging) nettles, hemp, jute, linen or flax (fibre flax and oil seed flax), and ramie, c) hard fiber plants, in particular sisal, kenaf and manila, d) coir, and e) grasses. Bast fiber plants, such as hemp and oil seed flax, are particularly useful natural non-woody, plant materials from which the fibers 108 can be obtained.

The bast plants include outer bast fibers that run longitudinally along the length of the plants and core tissue fibers disposed within the outer bast fibers. Because the core tissue fibers are the desired fibers, the outer bast fibers must be removed prior to use of the core fibers. In removing the outer bast fibers, care must be taken to avoid damaging or breaking the core tissue fibers in order to prevent damage from being done to the interior molecular structure of the core fibers, as well as to maximize the length of the core tissue fibers. Thus in a first step 210 the plant material or straw 106 is ratted in a storage location for the straw or other desired plant material under controlled environmental conditions (e.g., field ratted, dew ratted, chemically ratted and/or water rated). Additionally, in an alternative embodiment, the oil seed flax or other plant material 106 can be utilized without step 110, such that the material is unratted.

After step 210, the plant material 106 is cleaned in step 212. To clean the plant material 106, initially the material is semi-broken in step 214 by using a roller breaker at low rpm with little or no stress applied to the plant material 106. Subsequently the plant material is air and gravity cleaned in step 216 by placing the plant material in a suitable tumbling machine (uniaxial biaxial/multiaxial/rock and roll) with a fixed low rpm and directing a high speed air flow past and around the plant material as is it tumbled in the machine. This action separates any loosely attached sieve and dust from the plant material 106. After tumbling, in step 218 the plant material 106 is cleaned in a suitable cleaning device to remove the remaining sieve and dust from the plant material 106. If the straw is too dirty, e.g., mud is attached to it, then it can be washed in water in between 22 to 50° C. and dried for further mechanical processing.

Once the straw or plant material 106 has been cleaned, in step 220 the bast plant materials are mechanically treated, in which the plant materials are decorticated to remove the bast fibers from the core tissue fibers 108, as opposed to hammering or bending/flexing the plant material as in prior art decortication processes. By decorticating the bast fibers from the core tissue fibers 108, the core fibers 108 can more readily be kept intact, thereby maintaining the overall interior molecular structure and corresponding strength intact, and maintaining an increased length of the core fibers 108. Various processes for decortication can be used, so long as the process places little or no stress on the core fibers 108 so that the interior molecular structure remains undamaged, unlike other prior art processes that involve hammering or bending the plant material to remove the bast fibers. Some examples of decortication processes that can be used in step 220 include tumbling, scutching, picking and grading the plant materials 106. Using these processes, core fibers of approximately 95-98% purity can be obtained. In addition, both ratted and non-ratted plant material 106 can be used in the decortications process to obtain a clean, core tissue fiber 108 that can be used for production of the composite material.

Once removed from the bast fibers, the crude core fibers 108 are passed through at least one or more, and in one embodiment, a series of five (5) machines to produce the fine, clean and uniform core fibers 108 for use as biocomposite reinforcement fibers. First, the crude core fibers 108 are moved in step 222 to a combing machine in order to eliminate any remaining shive and to align the fibers into a clean fiber bundle.

In step 224, the bundles of the clean, crude core fibers 108 are passed through a micro-combing process which serves to open the crude fibers and separate the individual core fibers 108 in the bundle from one another. In performing this individual fiber separation, the aspect ratio of the individual fibers 108 is increased to enhance the reinforcement effect of the fibers 108 in the biocomposite. In this step 224, or as a modification to step 224, the fibers 108 can have an antistatic lube applied thereto to enhance the separation of the fibers 108.

In step 226, once separated the individual fibers 108 can be processed through a carder to align the finer premium quality fibers (clean, long, align, more uniform, strong) while discarding the lower quality fibers. The high quality fibers 108 are then combined in a suitable device into a roving, or a rope-like alignment of the fiber matrix in step 228, which is subsequently dried, by using drier such as in a dehumidifier, a thin layer drier cabinet, an oven or an RF or microwave drier, among other suitable devices to keep it dried. Drying conditions depend upon the particular device and the drying requirement (0-6% water w/w or v/v) and RH in step 230.

In step 232, the roving from step 230 is chopped or sheared into the desired size having the highest aspect ratio (i.e., length to diameter, for example 2 mm fiber for short biocomposite) for optimum reinforcement of the biocomposite material 102. The chopped roving can then be added in step 234 to the thermoplastic material 104 in either a pre-mixed state or directly into the hopper of an extrusion or injection molding machine to form the reinforced biocomposite material 102. The combination or mixing of the roving with the thermoplastic material 104 in step 234 can be accomplished by spraying the chopped fiber material 108 into the thermoplastic material 104, or by any of the manners and processes described previously with regard to the embodiment of FIG. 2 with any of the disclosed additives, processing aids disclosed with regard to the embodiment of FIG. 2.

Two ways fiber can be processed. One without chemical treatment and other chemically treated, in both cases same mechanically fiber processing steps need to be followed. Prior to either the combing step 222 or the micro-combing step 224, the core fibers 108 of the natural fibrous plant materials 106 can be chemically treated as illustrated in step 225 in order to separate the cellulose fibers 108 from the hemi-cellulose and lignin components of the core fibers or crude fiber can be processed and later it can go for chemical treatment prior to develop biocomposite formulation. The process employed in step 225 is similar to that used in step 111 of the embodiment of FIG. 2, such that a purified crystalline cellulose fraction of fibers 108 having an intact internal molecular structure can be added to the thermoplastic material 104 to form the composite material 102.

Once liberated from the natural plant material 106 in step 225, the cellulose fibers 108 can be further processed in either the micro-combing step 224 or both the combing step 224 and micro-combing step 226 to form fibers 108 having the desired attributes for addition to the thermoplastic material 104 to form the biocomposite 102 as described above.

Various other alternatives are contemplated is being within the scope of the following claims particularly pointing out and distinctly claiming the subject matter regarded as the invention.

We claim:

1. A reinforced thermoplastic resin composition comprising:
   a. a thermoplastic resin; and
   b. from about 1 to about 60 weight percent cellulose fibers based on the weight of the composition, the cellulose fibers obtained by a shearing decortication of a natural plant material that does not damage the internal molecular structure of the cellulose fibers.

2. The composition of claim 1 wherein the natural plant material is selected form the group consisting of natural fibrous plant materials including a) seed fiber plants, linters, cotton, kapok and poplar down, b) bast fiber plants, sclerenchyma fiber plants, bamboo fiber plants, (stinging) nettles, hemp, jute, linen or flax, and ramie, c) hard fiber plants, sisal, kenaf and manila, d) coir, and e) grasses.

3. The composition of claim 1 wherein the natural plant material is a bast fiber plant material.

4. The composition of claim 3 wherein the bast fiber plant material is selected from the group consisting of hemp and flax.

5. The composition of claim 3 wherein the cellulose fibers are formed of at least 95% pure cellulose fibers.

6. The composition of claim 1 wherein the thermoplastic resin is selected from the group consisting of polyethylene, polypropylene, polystyrene, polyvinyl chloride, polyacryl nitrite, polyamides, polyesters, polyacrylates and mixtures thereof.

7. The composition of claim 1 wherein the cellulose fibers and the thermoplastic resin are molecularly bonded to one another.

8. A method for making the reinforced thermoplastic resin composition of claim 1:
   a) providing an amount of cellulose fibers obtained by the separation of the cellulose fiber fraction from a natural plant material in a decortications process that leaves the internal molecular structure of the cellulose fiber fraction intact and aligned; and
   b) blending from about 1 to about 60 weight percent of the cellulose fibers based on the weight of the composition with a thermoplastic resin.

9. The method of claim 8 wherein the natural plant material is selected form the group consisting of bast fiber plants.

10. The method of claim 8 further comprising the step of separating the fibers after providing the fibers.

11. The method of claim 8 wherein the step of separating the fibers comprises:
    a) combing the fibers;
    b) micro-combing the fibers; and
    c) carding the fibers.

12. The method of claim 11 further comprising the steps of:
    a) forming the fibers after carding into a roving; and
    b) chopping the roving to a desired length.

13. The method of claim 8 wherein the step of providing the cellulose fibers comprises mechanically separating core tissue fibers from outer plant fibers while placing minimal stress on the core tissue fibers.

14. The method of claim 8 wherein the step of blending the cellulose fibers with the thermoplastic resin comprises mixing the cellulose fibers and the thermoplastic resin in parallel screw mixing device to minimize breakage of the interior molecular structure of the cellulose fibers and the residence time of the fibers and resin in the mixing device.

15. The method of claim 8 wherein the step of blending the cellulose fibers with the thermoplastic resin comprises forming molecular bonds between the cellulose fibers and the thermoplastic resin.

16. A reinforced thermoplastic resin composition comprising:
    a) a thermoplastic material; and
    b) from about 1 to about 60 weight percent cellulose fibers based on the weight of the composition, the cellulose fibers obtained by the separation of a cellulose fiber fraction from flax using a shearing decortication without damaging the internal molecular structure of the cellulose fiber fraction.

17. The composition of claim 16 wherein the cellulose fibers and the thermoplastic are molecularly bonded to one another.

18. The composition of claim 16 wherein the thermoplastic is a polyolefin or polyamide or an engineering plastic.

19. The composition of claim 18 wherein the thermoplastic is polypropylene or acrylonitrile butadiene styrene.

* * * * *